(12) United States Patent
Cabral et al.

(10) Patent No.: US 10,065,747 B2
(45) Date of Patent: Sep. 4, 2018

(54) LIGHTNING PROTECTION FOR AIRCRAFT FUSELAGE FUEL TANK VENTILATION LINES

(71) Applicant: EMBRAER S.A., São José dos Campos-SP (BR)

(72) Inventors: Adriano Donizetti Nogueira Machado Cabral, São Jose dos Campos (BR); Alessandro Da Rocha Mordente, São Jose dos Campos (BR); Lollan Naru Nonaka, São Jose dos Campos (BR); Lucas Mateus Machado Duarte Tavares, São Jose dos Campos (BR); Sidney Osses Nunes, São Jose dos Campos (BR); Valdeci Gomes De Oliveira, São Jose dos Campos (BR); Wellington De Moura Aoki, São Jose dos Campos (BR); Weber De Brito Barbosa, São Jose dos Campos (BR)

(73) Assignee: EMBRAER S.A., São José dos Campos-SP (BR)

( * ) Notice: Subject to any disclaimer, the term of this patent is extended or adjusted under 35 U.S.C. 154(b) by 12 days.

(21) Appl. No.: 15/014,279

(22) Filed: Feb. 3, 2016

(65) Prior Publication Data

US 2017/0217603 A1   Aug. 3, 2017

(51) Int. Cl.
*B64D 45/02*   (2006.01)
*B64D 37/06*   (2006.01)
*B64D 45/00*   (2006.01)

(52) U.S. Cl.
CPC .............. *B64D 45/02* (2013.01); *B64D 37/06* (2013.01); *B64D 2045/009* (2013.01)

(58) Field of Classification Search
CPC ................................ B64D 45/02; B64D 37/06
See application file for complete search history.

(56) References Cited

U.S. PATENT DOCUMENTS

| 3,906,308 | A | 9/1975 | Amason et al. |
| 6,736,354 | B2 * | 5/2004 | Goto ..................... B64D 37/08 137/572 |

(Continued)

*Primary Examiner* — Brian M O'Hara
*Assistant Examiner* — Michael B Kreiner
(74) *Attorney, Agent, or Firm* — Nixon & Vanderhye P.C.

(57) ABSTRACT

Lightning protected vent lines associated operatively with aircraft fuselage fuel tanks (i.e., on-board fuel tanks that are not physically located in an aircraft's wing but instead are physically located within the aircraft's fuselage structure) are provided which include a vent conduit, a coupling at a proximal end of the vent conduit for fluid connecting the vent conduit to the fuel tank, a vent opening positioned at a distal end of the vent conduit and at an external location of the fuselage and a flame arrestor positioned in the conduit between the coupling and the vent opening. The vent conduit will have an effective axial dimension (L) between the coupling and the vent opening and the flame arrestor will be positioned in the conduit at an effective separation distance (D) between an inlet of the flame arrestor and the vent opening such that L/D is greater than 5. Alternatively, the flame arrestor may be omitted, but the vent conduit will then have at least one linear conduit segment to provide an effective axial dimension ($L_1$) of the vent line conduit between the coupling and the vent opening which is at least ten times greater than the vent conduit diameter ($D_1$).

3 Claims, 4 Drawing Sheets

(56) References Cited

U.S. PATENT DOCUMENTS 6,823,831 B2 11/2004 Chu et al.
7,648,103 B2 * 1/2010 Barbosa ................. B64C 17/10
137/587
8,672,269 B2 3/2014 Motohashi et al.

* cited by examiner

LIGHTNING PROTECTION FOR AIRCRAFT FUSELAGE FUEL TANK VENTILATION LINES

FIELD

The embodiments disclosed herein relate generally to lightning protection systems and methods for fuel vents associated with aircraft fuel tanks that are not mounted in the aircraft wing(s), for example, fuel tanks mounted in the fuselage of the aircraft.

BACKGROUND

As is well known, aircraft are susceptible to lightning strikes when in the vicinity of convective weather activity. It is therefore not uncommon for lightning to strike an aircraft while maneuvering on the ground or in the air when in proximity to weather conditions likely to generate lightning discharges. For this reason, a variety of on-board lightning protection systems are known and adopted by aircraft manufacturers, as is evident from U.S. Pat. Nos. 3,906,308 and 8,672,269 (the entire content of each being expressly incorporated hereinto by reference).

Fuel tanks for aircraft are typically installed in the aircraft's main wing structures. Fuel tanks must include a vent to the ambient atmospheric environment to prevent negative pressure from occurring within the tank when the quantity of on-board fuel decreases via engine consumption during flight operations. The vent also ensures that the fuel tank is not over-pressurized during re-fueling operations. Conventional wing fuel tank vents include a vent opening typically located on the underside skin of the wing in a zone of low probability of lightning strikes. A duct connects the vent opening to the wing mounted fuel tank to allow ambient external air to communication between the vent opening and the fuel tank.

Those regions of the aircraft having a relatively high probability for direct lightning stroke attachment are known as Zone 1 regions. Zone 1 regions are typically those aircraft regions on the extremities of the aircraft's wing, vertical tail and horizontal stabilizer surfaces, nose and engines. Zone 2 regions are those regions usually adjacent to Zone 1 regions that are secondary direct lightning zones subject to lightning swept strokes. For this reason, wing fuel tank vents are typically located outside of Zone 1 or 2 regions. Specifically, fuel wing vents are typically located in a Zone 3 region, i.e., a zone of low lightning strike probability, located near the aircraft's wing tip. Locating the vent openings outside of Zones 1 and 2 prevents a lightning stroke attachment from causing a streamer being initiated at the wing fuel vent opening at a time when the fuel vapor condition at the vent opening is critical. As a result of locating the vent openings outside of Zone1 and Zone 2 regions thereby avoids a local explosion that could propagate into the fuel tank causing a catastrophic explosion.

Tankage of fuel in the aircraft's fuselage causes several unique problems in terms of lightning protection since the aircraft's fuselage is entirely within a Zone 2 region of lightning streamer risk aft of the aircraft's Zone 1 nose region. As such, in order to provide safe venting of the fuselage mounted fuel tanks to a Zone 3 region as near as possible to the aircraft's main wing tips, various onerous systems must be employed. For example, in order to provide a vent outlet located in a Zone 3 region for on-board fuselage mounted fuel tanks, extensive piping, valves and fittings must be provided and routed between the fuselage mounted fuel tanks and their associated vent openings located on the main wings of the aircraft. As a result, added weight of such vent-related structures as well as lesser flow rates and pressures associated with the supply and transfer of fuel in the fuselage mounted fuel tanks will ensue.

What has been needed in the art, therefore, are lightning protection systems and methods for aircraft fuel tanks that are not mounted in the wing, e.g., within an aircraft's fuselage, that minimize if not eliminate entirely the disadvantages discussed above.

SUMMARY

The embodiments disclosed herein are generally directed toward lightning protected vent lines associated operatively with aircraft fuselage fuel tanks (i.e., on-board fuel tanks physically located within the aircraft's fuselage structure). An aircraft may therefore comprise a fuselage and a fuel tank mounted within the fuselage, the fuel tank including at least one lightning protected vent line.

According to one embodiment, the lightning protected vent line will include a vent conduit, a coupling at a proximal end of the vent conduit for fluid connecting the vent conduit to the fuel tank and a vent opening positioned at a distal end of the vent conduit and at an external location of the fuselage to establish fluid communication between the fuel tank and an ambient environment externally of the fuselage. A flame arrestor is positioned in the conduit between the coupling and the vent opening. The vent conduit according to such embodiment will therefore have an effective axial dimension (L) between the coupling and the vent opening, with the flame arrestor being positioned in the conduit at an effective separation distance (D) between an inlet of the flame arrestor and the vent opening such that L/D is greater than 5.

According to another embodiment, the flame arrestor is omitted, but the vent conduit will have at least one linear conduit segment to provide an effective axial dimension ($L_1$) of the vent line conduit between the coupling and the vent opening which is at least ten times greater than the vent conduit diameter ($D_1$).

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
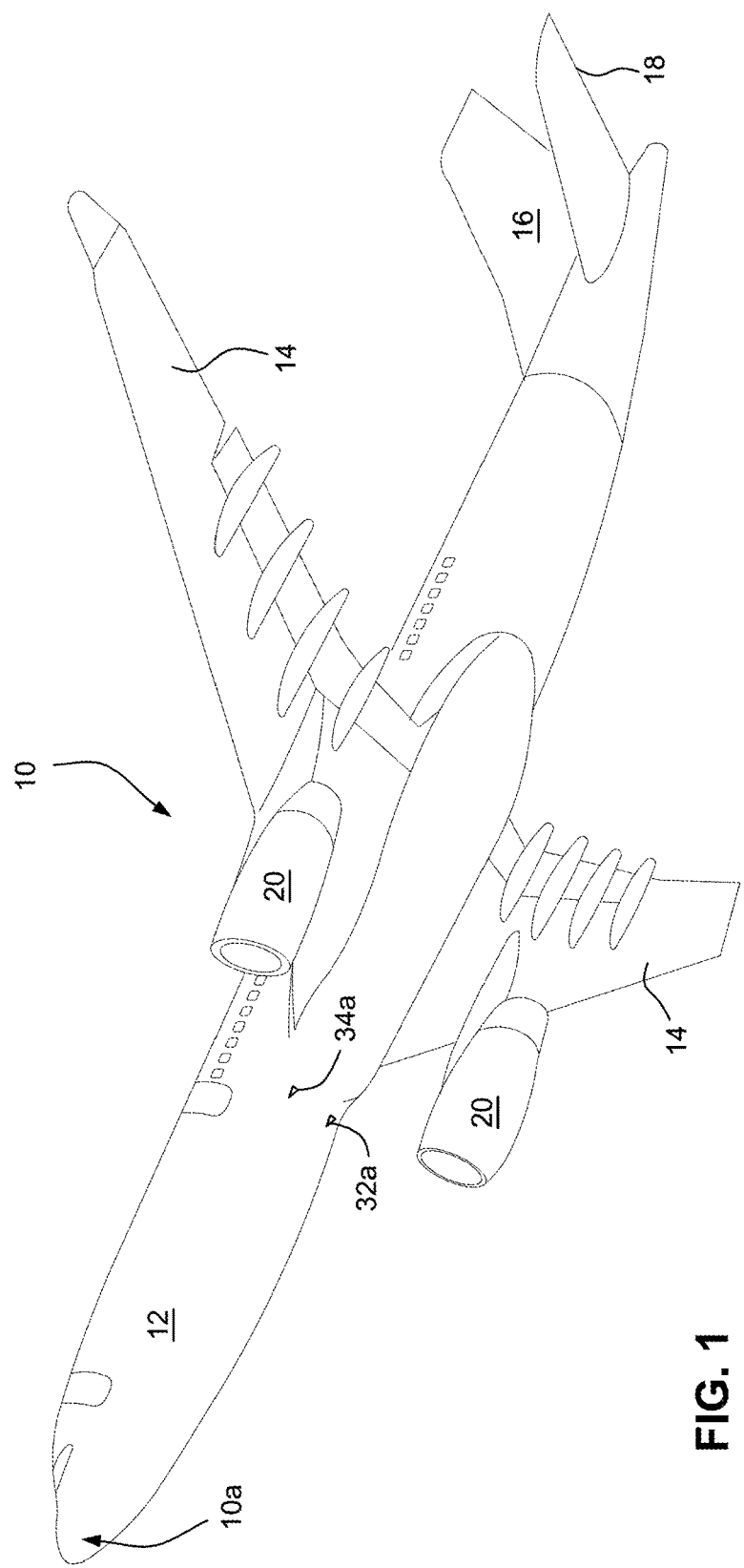
FIG. 1 is a bottom perspective view of an aircraft equipped with fuselage mounted fuel tanks and associated fuel vent openings in accordance with an embodiment of the invention described herein.

Accompanying FIG. 1 depicts a conventional multiengine transport category aircraft 10 having a fuselage 12, opposed main wings 14, a vertical tail surface 16 and opposed horizontal stabilizer surfaces 18 (only the port side stabilizer surface 18 being visible in FIG. 1). Each of the wings 14 supports a respective one of the under-wing mounted turbofan engines 20.

Figure 2:
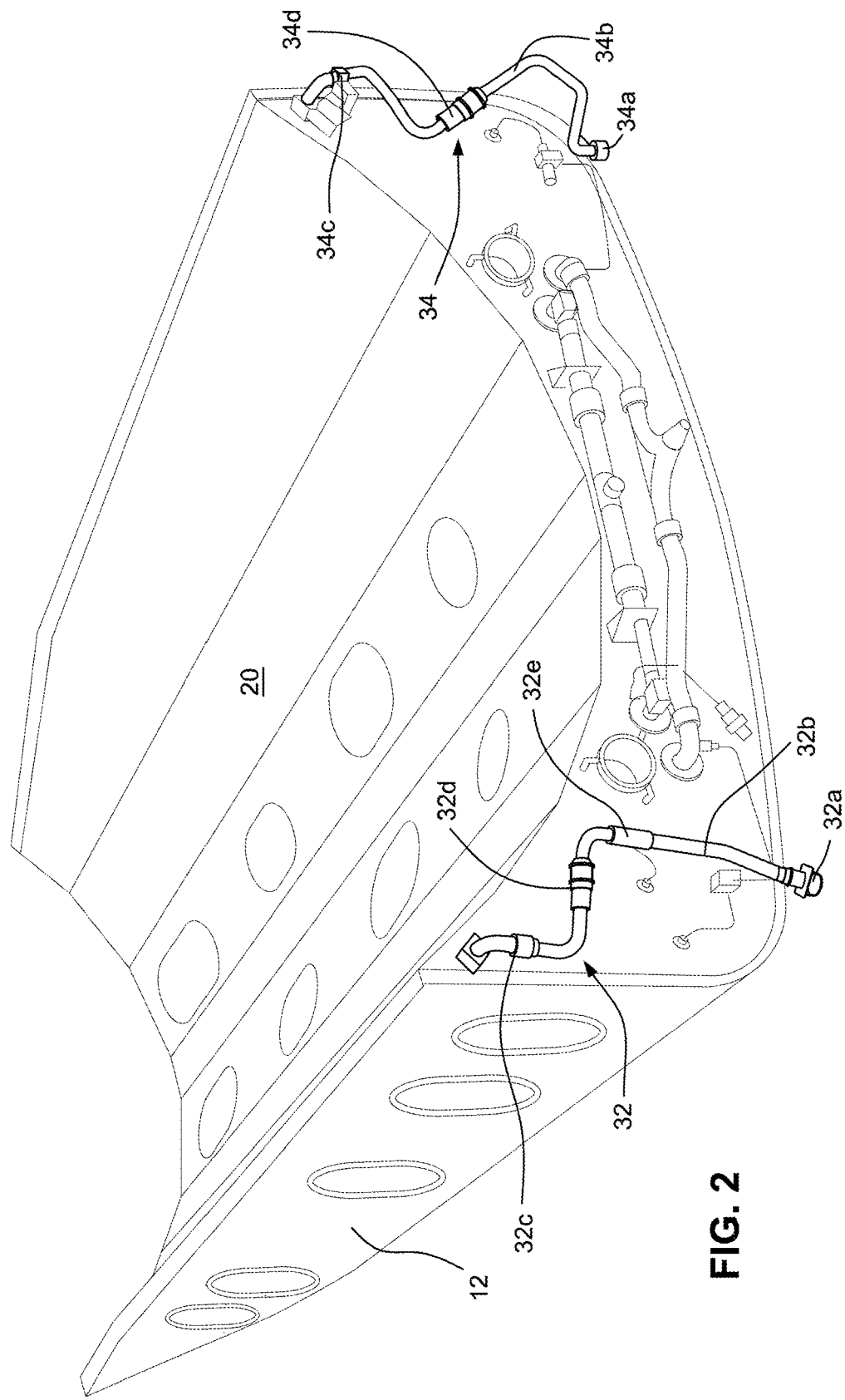
FIG. 2 is a perspective view of a fuselage mounted fuel tank employed in the aircraft of FIG. 1 showing an embodiment of the lightning protected fuel vent line system of the invention described herein.

FIG. 2 is an aft view of a fuselage fuel tank 30 that may be provided within a ventral portion of the fuselage 12 of the aircraft 10. As shown, the ventral fuselage fuel tank 30 is provided with a pair of vent lines 32, 34 each terminating at a distal end thereof with a vent opening 32a, 34a located externally on the skin of the fuselage 12 (see FIG. 1). Each of the vent lines 32, 34 is provided with a vent conduit 32b, 34b extending from a fluid coupling 32c, 34c with the ventral fuselage fuel tank 30 located at a proximal end of the conduits 32b, 34b to the vent openings 32a, 34a, respectively, and a flow through flame arrestor 32d, 34d operatively positioned in the vent conduits 32b, 34b between the vent openings 32a, 34a and the couplings 32c, 34c, respectively.

As can be appreciated, the vent openings 32a, 34a are located physically at the external skin of the fuselage 12 within a Zone 2 risk region aft of the Zone 1 risk region of the aircraft's nose 10a. In accordance with the embodiment depicted in FIG. 2, each of the vent lines 32, 34 includes lightning protection in accordance with an embodiment of the invention. More specifically, the present applicants have discovered that providing flame arrestors 32d, 34d within the conduits 32b, 34b and locating the flame arrestors 32d, 34d a specified distance from the vent opening 32a which satisfies the relationship L/D>5 provides adequate Zone 2 lightning protection, whereby L is a total effective axial dimension (mm) of the conduit 32b, 34b and D is the effective axial separation distance between the inlet of the flame arrestor 32d, 34d and the vent opening 32a, 34a, respectively.

The term "effective axial dimension" as used herein and in the accompanying claims is defined as being a nominal lengthwise dimension (mm) of the conduits 32b, 34b which includes the sum of the axial dimension(s) of each straight line segment in the conduits 32b, 34b as well as the axial dimension(s) of each bend segment in the conduits 32b, 34b as measured between the vent openings 32a, 34a and the fuel tank couplings 32c, 34c, respectively.

The term "effective axial separation distance" as used herein and in the accompanying claims is defined as a nominal lengthwise dimension (mm) of the conduits 32b, 34b as measured between the inlet to the flame arrestors 32d, 34d and the vent openings 32a, 34a to include the sum of the axial dimension(s) of each straight line segment in the conduits 32b, 34b as well as the axial dimension(s) of each bend segment in the conduits 32b, 34b.

Figure 3:
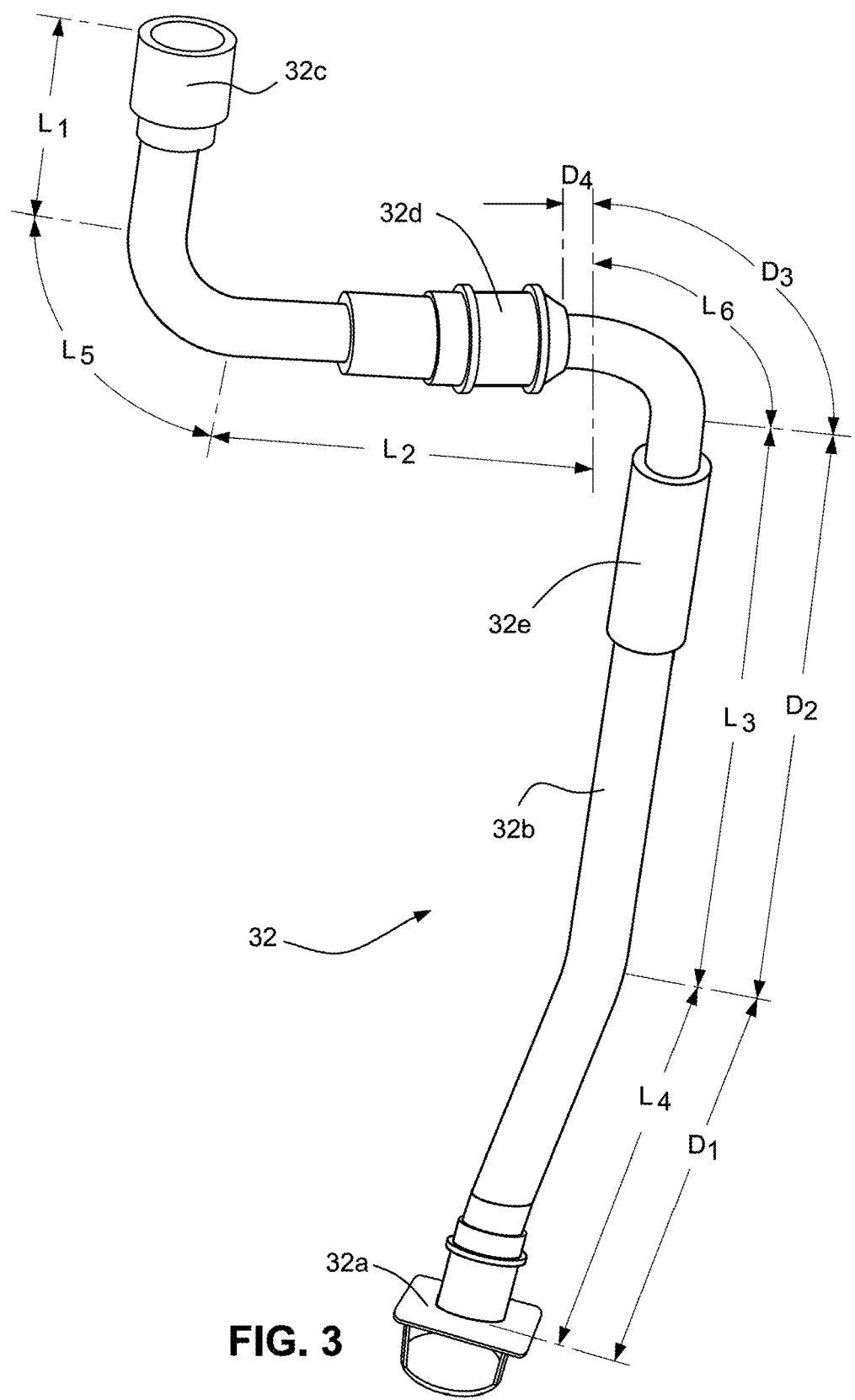
FIG. 3 is an enlarged elevational view of an exemplary lightning protected fuel vent line system shown in FIG. 2.

Accompanying FIG. 3 illustrates the principal components of the vent line 32 and an exemplary graphical depiction of the effective axial dimension L and the effective axial separation distance D for the dimensionless relationship L/D>5. As will be seen, the effective axial dimension L of the vent line 32 shown in FIG. 3 includes the axial dimensions of each linear (straight line) segment $L_1$ through $L_4$ and the axial dimensions of the bend segments $L_5$ and $L_6$. Thus, the effective axial dimension L (mm) of the vent line 32 equals the axial dimensions (mm) of the linear and bend segments $L_1+L_2+L_3+L_4+L_5+L_6$. Similarly, the effective axial separation distance D for the vent line 32 shown in FIG. 3 is the axial dimensions of each linear (straight line) segment $D_1$, $D_2$ and $D_4$ and the axial dimension of the bend segment $D_3$. Thus, the effective dimension L (mm) of the vent line 32 equals the axial dimensions (mm) of the linear and bend segments $D_1+D_2+D_3+D_4$. Similar dimensional analyses can be made for the vent line 34 shown in FIG. 2 and is thus equally applicable thereto even though a different number of linear and bend segments may be employed.

Any conventional flame arrestor that is suitable for handling aviation grade fuels may be employed as the flame arrestors 32d, 34d in the vent lines 32, 34 discussed above. One particularly advantageous flame arrestor that may be employed is that described in U.S. Pat. No. 6,823,831 ("US '831"), the entire content of which is expressly incorporated hereinto by reference. The flame arrestor of the US '831 patent is described as being usefully employed for fuel pump discharge and not for use as a fuel vent line component for lightning protection.

The vent lines 32 and 34 may include other structures conventionally employed with aircraft fuel lines. For example, the vent line 32 shown in FIG. 3 is depicted as including a suitable anti-chafing sleeve 32e to prevent mechanical wear of the vent conduit 32b at a desired location thereof. Mechanical connectors and the like may be provide but are not shown for ease of description.

Figure 4:
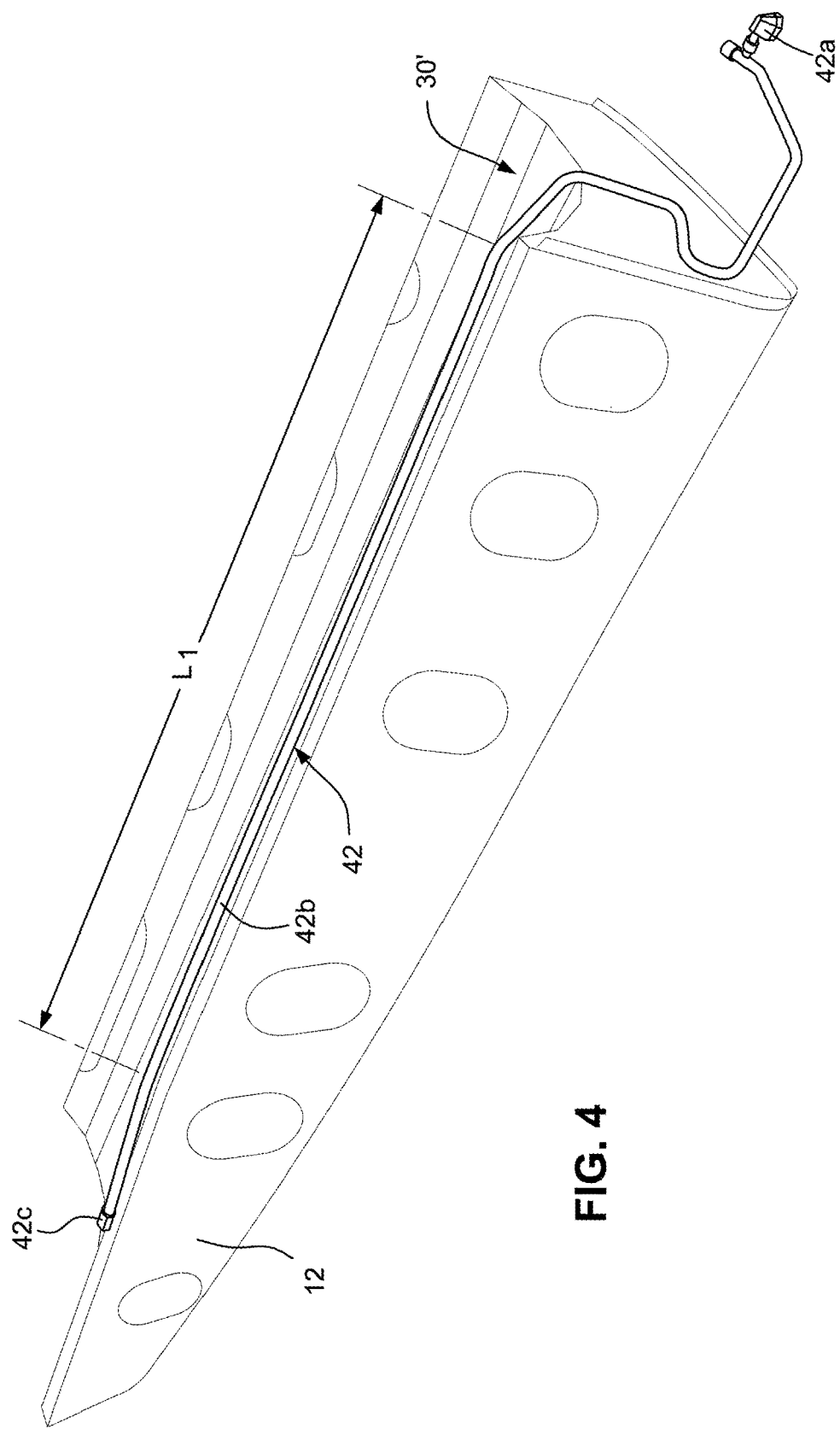
FIG. 4 is a perspective view of a fuselage mounted fuel tank which includes another embodiment of the lightning protected fuel vent line system of the invention described herein.

An alternatively embodiment of a lightning protected vent line 42 for a fuselage fuel tank 30' that may be located within the ventral portion of the fuselage 12 of aircraft 10 is depicted in accompanying FIG. 4. Unlike the embodiment described above in relation to FIGS. 2 and 3, the vent line 42 depicted in FIG. 4 does not include a flame arrestor. Instead, according to the embodiment of FIG. 4, the vent line 42 has conduit 42 having at least one lengthwise conduit segment 42b between the vent opening 42a and the fuel tank coupling 42c with an effective axial dimension (mm) $L_1$ that is at least ten times greater than the diameter $D_1$ of the conduit 42b, i.e, so as to satisfy the dimensionless relationship of $L_1/D_1>10$.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. An aircraft comprising a fuselage having a forward nose portion and a rearward tail portion, and a fuel tank mounted within the fuselage between the nose and tail portions, the fuel tank including at least one lightning protected vent line, wherein the at least one lightning protected vent line comprises:

a vent conduit which includes multiple linear segments and multiple bend segments;

a coupling at a proximal end of the vent conduit for fluid connecting the vent conduit to the fuel tank;

a vent opening positioned at a distal end of the vent conduit and at an external location of the fuselage within a Zone 2 lightning strike risk region aft of a Zone 1 lightning strike risk region located at the nose portion of the aircraft to thereby establish fluid communication between the fuel tank and an ambient environment externally of the fuselage which is within the Zone 2 lightning strike risk region of the aircraft; and a flame arrestor positioned in the conduit between the coupling and the vent opening, wherein the vent conduit comprises at least one bend segment between the coupling and the flame arrestor and at least one other bend segment between the flame arrestor and the vent opening, and wherein the vent conduit has an effective axial dimension (L) of the multiple linear and bend segments between the coupling and the vent opening, and wherein the flame arrestor is positioned in the vent conduit between the at least one bend segment and the at least one other bend segment so as to define an effective separation distance (D) between an inlet of the flame arrestor and the vent opening such that a ratio L/D of the effective axial dimension (L) to the effective separation distance (D) is greater than 5.

2. The aircraft as in claim 1, wherein the fuel tank is located in a ventral region of the fuselage.

3. The aircraft as in claim 1, wherein the fuel tank comprises a pair of the lightning protected vent lines.

* * * * *